F. E. FARMER.
AUTOMATIC BRAKE FOR HOISTING MACHINES.
APPLICATION FILED FEB. 21, 1908.
905,679.
Patented Dec. 1, 1908.
2 SHEETS—SHEET 1.
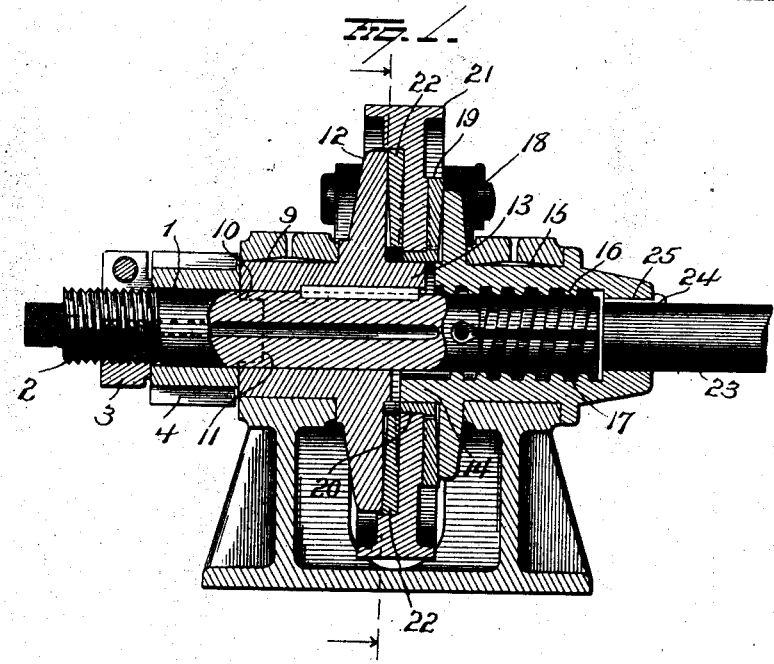
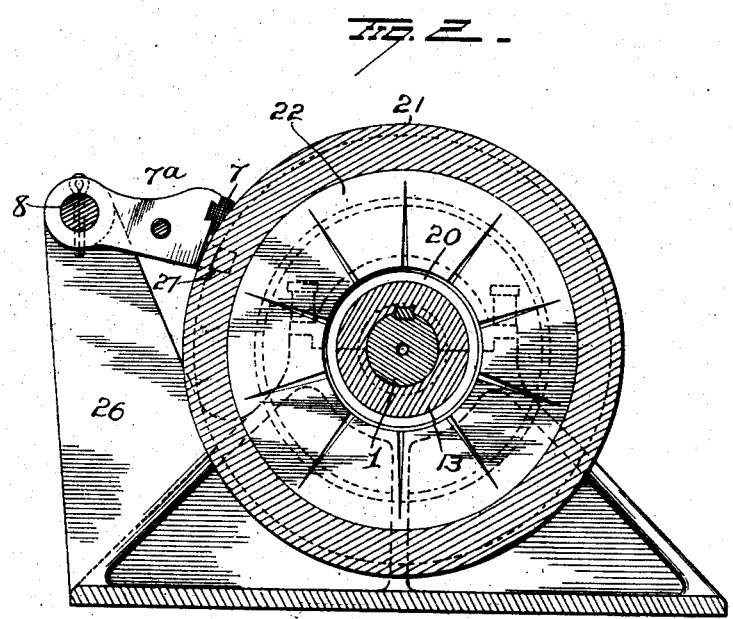
WITNESSES
INVENTOR F. E. FARMER.
AUTOMATIC BRAKE FOR HOISTING MACHINES.
APPLICATION FILED FEB. 21, 1908.
905,679.
Patented Dec. 1, 1908.
2 SHEETS—SHEET 2.
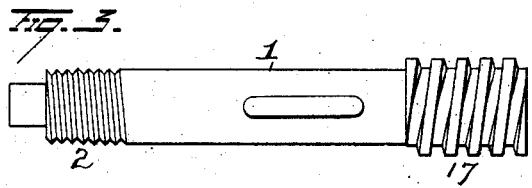
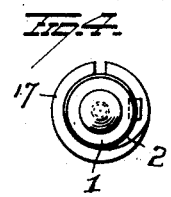
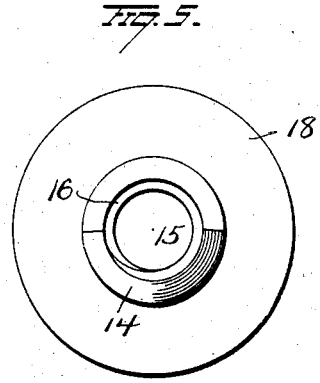
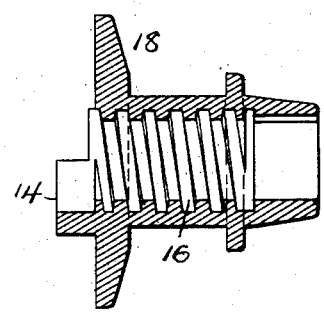
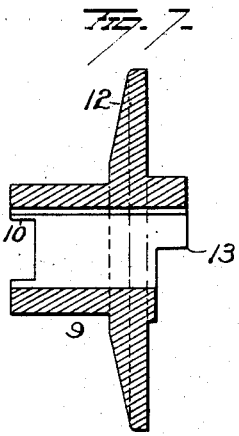
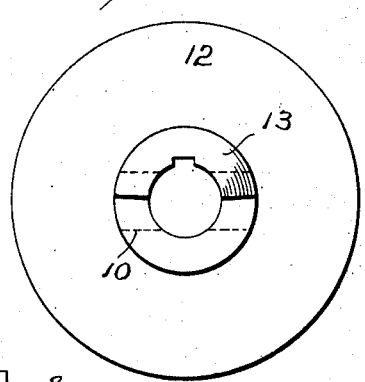
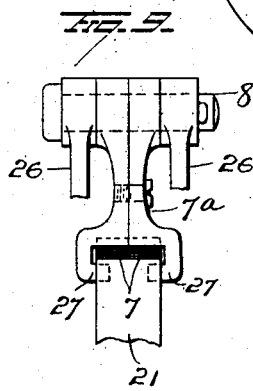
WITNESSES
INVENTOR
F. E. Farmer
By H. A. Seymour
Attorney

UNITED STATES PATENT OFFICE.

FRED E. FARMER, OF ALLIANCE, OHIO, ASSIGNOR TO THE MORGAN ENGINEERING COMPANY, OF ALLIANCE, OHIO.

AUTOMATIC BRAKE FOR HOISTING-MACHINES.

No. 905,679.  Specification of Letters Patent.  Patented Dec. 1, 1908.

Application filed February 21, 1908. Serial No. 417,131.

*To all whom it may concern:*

Be it known that I, FRED E. FARMER, of Alliance, in the county of Stark and State of Ohio, have invented certain new and useful Improvements in Automatic Brakes for Hoisting-Machines; and I do hereby declare the following to be a full, clear, and exact description of the invention, such as will enable others skilled in the art to which it appertains to make and use the same.

My invention relates to an improvement in automatic brakes for hoisting machines, and is designed as an improvement on the construction disclosed in U. S. Patent No. 718,802 granted to C. L. Taylor January 20th, 1903.

In the patent above referred to, the friction ring carries a wheel provided on its periphery with ratchet teeth which are engaged by pawls having friction blocks engaging the sides of the wheel so that when the hoist drum is turning in one direction as in lifting the load, the pawls will be moved out of contact with the ratchet teeth and permit the wheel to turn without hindrance. When however the direction of rotation of the hoist drum is reversed, as in lowering the load, the pawls will be positively moved into contact with the teeth on the wheel and lock the latter against movement.

With the ratchet and pawl construction, there is, owing to the space between the end of the pawl and the nearest tooth on the wheel, more or less short and sudden reverse movement of the wheel and consequently the hoist drum and load carried thereby, at the instant the hoisting power is removed from the shaft carrying the friction disks, and the object of the present invention is to overcome this objectionable feature by providing means always in engagement with the periphery of the wheel and operating to lock the latter against reverse movement the instant the hoisting power ceases.

My invention consists in the parts and combinations of parts as will be more fully described and pointed out in the claims.

In the accompanying drawings, Figure 1 is a view in longitudinal section of my improved brake. Fig. 2 is a view in section looking toward the ratchet-wheel. Fig. 3 is a view in elevation of the screw-shaft. Fig. 4 is an end view of same. Figs. 5 and 6 are end and sectional views, respectively, of sleeve 15; Figs. 7 and 8 are section and end views, respectively, of sleeve 9 and Fig. 9 is a view in plan of the brake showing a section of the wheel.

1 represents a shaft which may be coupled up with any suitable source of power. In overhead traveling cranes, to which class of machines this brake is specially applicable, this shaft 1 would preferably be coupled up to the armature-shaft of the hoist-motor and drive the hoisting-drum, and for the purpose of illustrating the operation of the brake or clutch, I will describe it as applied to the hoisting mechanism of an overhead traveling crane. The shaft 1 is provided at its free end with screw-threads 2 for the attachment of the split clamping-nut 3, and loosely mounted on the shaft and bearing against the nut 3 the pinion 4, which latter transmits motion to the hoist-drum gearing.

Keyed to the shaft 1 is the sleeve 9, provided at its outer end with teeth 10, which intermesh with teeth 11 on the inner end of pinion 4. Hence when shaft 1 is rotated sleeve 9 rotates therewith and rotates pinion 4. The sleeve 9 is provided at its inner end with the thrust flange or collar 12 and with the teeth 13, intermeshing with the teeth 14 on end of sleeve 15, which latter is provided with internal threads 16, meshing with threads 17 on shaft 1, and with a thrust flange or collar 18, which bears against the rear face of the friction-ring 19. This friction-ring 19 is provided with a hub 20 embracing and resting on the overlapping teeth 13 and 14 of the two sleeves.

Located between the thrust flange or collar 12 and the front face of the wheel 21 is the friction-disk 22, which latter may be secured to either flange 12 or wheel 21 or left loose.

Projecting into the screw-sleeve 15 is the main shaft 23, which latter transmits motion from the motor (not shown) to driven shaft 1 through the parts described. Shaft 23 is provided with a groove 24, in which the spline 25 rests, the latter also resting in a corresponding groove in the sleeve 15. The sleeve 15 therefore rotates with shaft 23.

With the wheel 21 mounted as described it rests between the thrust collar 12 and the friction-ring 19. This wheel 21 is provided at its periphery with laterally projecting flanges the peripheries of which are engaged by the brake shoes 7. These shoes (two in number) are each formed integral with an arm 7ª, the two arms being pivotally mounted on a pin 8 carried by the brackets 26, the latter being fixed with relation to the wheel 21. The two shoes thus mounted are located side by side on the periphery of wheel 21, and each is provided at its outer edge, and at a point below its upper end with a hook shaped member 27 embracing the sides and under faces of the flanges of the wheel, and normally rest in close contact therewith. The face of each shoe is dovetailed to receive the friction blocks 7ª which latter are curved to conform to the contour of the wheel, and may be of any material suitable for the purpose. The arms carrying the shoes 7 normally rest in a slightly inclined position in a plane intermediate the top of the wheel 21 and axis of the latter, with the hooked portion 27 of each shoe at the lower end of the latter, so that when the wheel 21 is revolving in a direction to hoist the load, the rotation of the wheel slightly lifts the shoes thus removing all friction and permitting the wheel to freely revolve. When the hoist stops the suspended weight tends to turn wheel 21 in a reverse direction. The instant however the wheel comes to a stop this tendency toward reverse movement causes the hooked members of the shoes to engage the flange and pull the shoes tightly against the face of the wheel thus locking the wheel against rotation and holding it against movement while the load is being lowered.

The parts are so constructed that when shaft 23 begins to rotate in a direction to hoist, the sleeve 15 by its engagement with the threads 17 of shaft 1 will be moved longitudinally, which movement operates through its thrust-collar 18 and ring 19 to force the wheel 21 solidly against the thrust flange or collar 12, and thus lock these parts together. The rotary movement of the sleeve 15 through the friction devices above described and also through its teeth 14 imparts rotary motion to the sleeve 9, and as the latter is keyed to shaft 1 it follows that the latter will also be rotated in the same direction. It will also be apparent that with the load suspended from the hoisting-drum the weight of the load will tend to turn the shaft 1 in the direction to lower; but as the shaft begins to turn the threads 17 of the shaft engage the threads 16 of sleeve 15 and apply the friction devices. To lower the load, the direction of rotation of the motor and shaft 23 is reversed, and as a reverse, or backward movement of wheel 21 is prevented by the shoes before referred to this reverse motion tends to release the friction between the flanged-wheel and the friction parts. As soon as the friction is relieved the sleeve 15 tends to turn with wheel 9 and the tendency of the parts is to race. As soon, however, as shaft 1 begins to race under the influence of the load the threads 17 thereon operate to move sleeve 15 in a direction to apply the friction to the wheel 21, which, as before explained, is held against backward rotation, and as soon as the friction is applied the racing of the shaft is checked.

It is evident that my improvement may be applied to clutch mechanism other than that described, hence I would have it understood that I do not limit the application of my brake to any particular form of clutch mechanism but consider myself at liberty to employ it in connection with any mechanism that is designed to rotate freely in one direction, but which must be sustained against movement in the opposite direction.

Having fully described my invention what I claim as new and desire to secure by Letters-Patent, is:—

1. In an automatic brake the combination with friction gearing comprising a flanged wheel and disks coöperating with the latter, of a pivoted shoe bearing against the periphery of said wheel and provided with a hook shaped member underlying the flange of the wheel.

2. In an automatic brake the combination with friction gearing comprising a flanged wheel and coöperating disks, of a pivoted shoe normally resting on the wheel and provided at a point below its upper end with a hook-shaped member underlying the flange of the wheel and in a position to engage said flange.

3. In an automatic brake the combination with friction gearing comprising a flanged wheel and coöperating disks, of a pivoted arm provided at its free end with a brake shoe resting against the periphery of the wheel, and a hook shaped member carried by the shoe and underlying the flange on the wheel, the said hook shaped member being in a plane below the axis of the brake shoe.

4. In an automatic brake the combination with friction gearing comprising a flanged wheel and coöperating disks of two pivoted arms, each provided at its free end with a brake shoe the said shoes resting against the periphery of the wheel and each provided with a hook shaped member underlying the flanges of the wheel.

In testimony whereof, I have signed this specification in the presence of two subscribing witnesses.

FRED E. FARMER.

Witnesses:
N. C. TETTERS,
E. E. BROSIUS.